A. Y. SEELY.
MACHINE FOR LACQUERING CANS.
APPLICATION FILED JAN. 22, 1910.
1,021,074.  Patented Mar. 26, 1912.
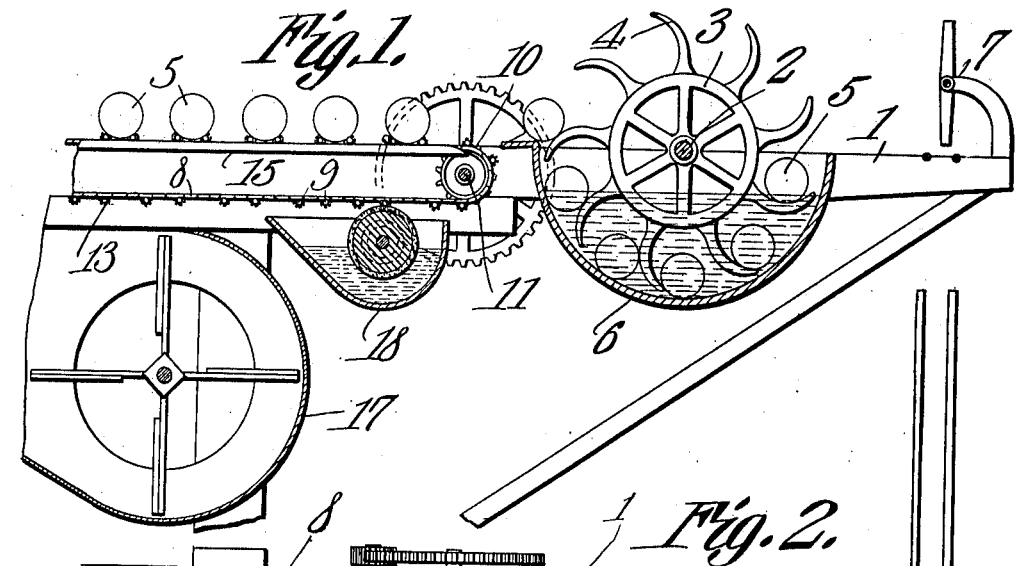
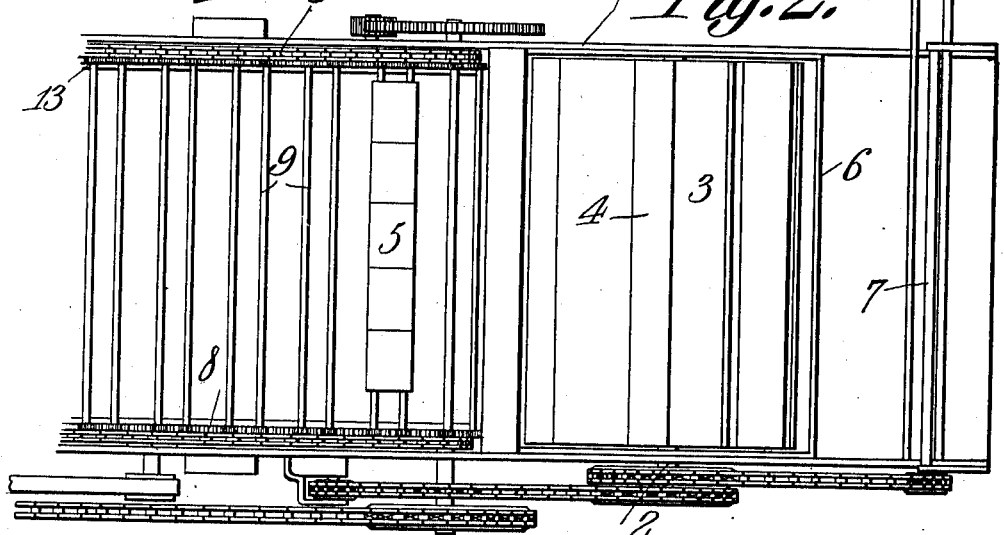
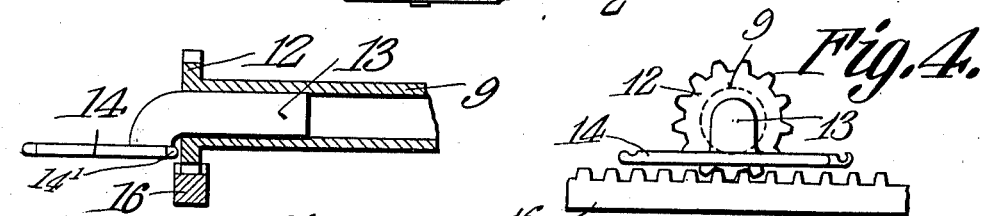
Witnesses
Inventor
Arthur Y. Seely.
By C. A. Snow & Co.
Attorneys

UNITED STATES PATENT OFFICE.

ARTHUR Y. SEELY, OF BLAINE, WASHINGTON.

MACHINE FOR LACQUERING CANS.

1,021,074. Specification of Letters Patent. Patented Mar. 26, 1912.

Original application filed November 21, 1908, Serial No. 463,831. Divided and this application filed January 22, 1910. Serial No. 539,453.

*To all whom it may concern:*

Be it known that I, ARTHUR Y. SEELY, a citizen of the United States, residing at Blaine, in the county of Whatcom and State of Washington, have invented a new and useful Machine for Lacquering Cans, of which the following is a specification.

This invention has reference to improvements in can lacquering machines of the general type in which cans are carried through a bath of lacquer by a suitable mechanism and are then conveyed away on an endless belt.

The present invention is shown and described in another application filed by me on November 21, 1908, under Serial No. 463,831 for machine for lacquering cans, of which application the present application is a division.

The present invention has reference more particularly to a means for causing the cans while being conveyed away on the endless belt to roll around their longitudinal axes in order to present all surfaces of the cans to the action of air and thereby facilitate the drying of the lacquer.

In accordance with the present invention the cross members of the belt are in the form of cylinders or tubes arranged in pairs, the individual members of which are so spaced as to sustain the cans which have been lacquered, and these individual cross bars are provided at one or both ends with gears designed to engage racks in their paths so that these cross bars are given a rotary motion as the belt is traveling and by the travel of the belt.

The invention will be best understood from a consideration of the following detail description taken in connection with the accompanying drawings forming a part of this specification in which drawings—

Figure 1 is a longitudinal section with parts in elevation showing a can lacquering machine of the type to which the present invention is applicable. Fig. 2 is a plan view of the structure shown in Fig. 1. Fig. 3 is a detail section showing one of the rotatable cross slats of the conveyer belt. Fig. 4 is an end elevation of the structure shown in Fig. 3.

Referring to the drawings, there is shown a suitable frame 1 upon which the several parts of the machine are mounted. Near one end of the frame there is mounted a shaft 2 carrying a drum 3 having on its periphery a circular series of longitudinal blades 4 spaced apart and curved to act as propelling and lifting blades for directing cans 5 to be lacquered through a lacquer bath 6, which latter is shown as a semi-cylindrical trough curved about the axis of the shaft 2 and containing sufficient lacquer solution to immerse the cans 5 when moved through the trough by the blades 4. The cans are directed to the trough 6 by a can-feeding mechanism indicated generally at 7, but since it forms no part of the present invention and is fully described in the aforesaid application of which the present case is a division, no further description of this part of the machine is deemed necessary. After leaving the lacquering trough 6 the cans move onto a conveyer belt 8 made up of two endless sprocket chains spaced apart so as to be located on opposite sides of the machine, and rotatable cross bars 9. The chains of the conveyer belt pass around sprocket wheels 10 adjacent to the lacquer trough 6, and also pass around similar sprocket wheels at the other end of the machine, but this being a well-known manner of supporting conveyer belts it is not deemed necessary to show the same. The sprocket wheels 10 are mounted on a shaft 11 journaled in the frame 1 and this shaft may receive motion in any suitable manner. The cross pieces 9 are arranged in pairs so spaced in the direction of travel of the belt as to carry the cans 5 at two points but these cross pieces are not sufficiently spaced apart to permit cans passing between them. The cross pieces or slats 9 are shown in Fig. 3 as tubular, but it will be understood that these pieces 9 may be tubular throughout their length or only partly throughout their length. At one or both ends of the cross pieces 9 they have secured thereto or formed thereon gear wheels 12.

Entering the ends of the cross pieces 9 are studs or spindles 13 fitting into the cross pieces 9 snugly but not too tightly to permit the said cross pieces freely turning on their longitudinal axes. The studs 13 are formed on appropriate links 14 of the sprocket chain forming part of the conveyer belt. The ends of the spindles 13 are curved downwardly as shown in Fig. 3 and in order to prevent the tubular cross piece 9 from moving outwardly or longitudinally and jamming on the curved portion of the spindle 13, the chain link 14 has a projecting portion 14' which extends inwardly beyond the curved portion of the spindle 13 and contacts with the outer face of the pinion or gear wheel 12 so as to prevent outward or longitudinal movement of the tubular cross piece 9.

The runs of the conveyer belt are supported on longitudinal members 15, but it is found that the frictional engagement of these members with the cross members or rollers 9 is insufficient to insure the rotation of the cross members or rollers 9. In order to positively rotate the cross members or rollers 9 longitudinal racks 16 are made fast to the side members of the frame 1 and these racks are engaged by the teeth of the gears or pinions 12 at the ends of the cross members or rollers 9. By this means the rollers 9 are positively rotated and the cans 5 supported on the pairs of rollers 9 consequently receive rotative movement on their longitudinal axes and all parts of the can are therefore subjected to the drying action of the air. The drying action may be augmented by means of a current of air delivered by a blower 17, but this in itself forms no part of the present invention.

There is also shown in Fig. 1 a cleaning mechanism 18 for removing adherent lacquering material from the rollers 9, but as this feature forms the subject matter of another application it need not be herein described in detail. This cleaning mechanism is also shown and described in the aforesaid application No. 463,831.

What is claimed is:

A lacquering machine conveyer comprising a pair of parallel endless chains, each having a plurality of links provided with upwardly curved and inwardly directed spindles, each of said links having a projecting portion extending inwardly beyond the curved portion of the adjacent spindle, tubular cross pieces engaging the inwardly directed ends of oppositely disposed spindles, each of said cross pieces having a pinion at each end thereof, the outer face of each pinion being adapted to engage the inwardly projecting portion of the adjacent link to limit outward movement of the cross piece, and a pair of parallel racks engaging the pinions of said cross pieces.

In testimony that I claim the foregoing as my own, I have hereto affixed my signature in the presence of two witnesses.

ARTHUR Y. SEELY.

Witnesses:
J. A. NEHM,
G. B. JENISON.

---

Copies of this patent may be obtained for five cents each, by addressing the "Commissioner of Patents, Washington, D. C."